United States Patent [19]

Sugihara

[11] Patent Number: 4,607,302
[45] Date of Patent: Aug. 19, 1986

[54] MODE SWITCH ACTUATOR FOR TAPE RECORDERS

[75] Inventor: Masanori Sugihara, Saitama, Japan

[73] Assignee: Pioneer Electronic Corporation, Tokyo, Japan

[21] Appl. No.: 413,841

[22] Filed: Sep. 1, 1982

[30] Foreign Application Priority Data

Sep. 2, 1981 [JP] Japan .............................. 56-130472
Sep. 2, 1981 [JP] Japan .............................. 56-130481
Sep. 2, 1981 [JP] Japan .............................. 56-130482

[51] Int. Cl.[4] .................... G11B 5/008; G11B 15/00
[52] U.S. Cl. ................................. 360/96.1; 360/96.3
[58] Field of Search ................... 360/74.1, 93, 96.3, 360/96.1; 242/198–200

[56] References Cited

U.S. PATENT DOCUMENTS 4,147,898 4/1979 Tozune .......................... 360/74.1 X
4,370,686 1/1983 Katoh ................................ 360/96.3

Primary Examiner—A. J. Heinz
Attorney, Agent, or Firm—Sughrue, Mion, Zinn, Macpeak, and Seas

[57] ABSTRACT

A cassette recorder is equipped with a plunger operated mode selection unit featuring a plurality of independently selectible mode operating rods including lockable rods and a stop rod for releasing locking or retained rods. The plungers are solenoid operated devices which operate to bring a drive gear into engagement with a gear including a cam actuator for engaging a follower to depress a selected mode operation rod.

9 Claims, 8 Drawing Figures

MODE SWITCH ACTUATOR FOR TAPE RECORDERS

BACKGROUND OF THE INVENTION

This invention relates to a mode operation apparatus for a tape recorder, and more particularly to a mode operation apparatus used in an electrically switched tape recorder which may employ a plunger drive.

A tape recorder is provided with various operational modes such as stop (STOP), fast forward (FF), rewind (RWD) playback (PLAY) and record (REC), and manual operation is widely carried out by pressing switching rods to switch modes. Recently, however, these has been provided an electrically operated device employing a motor or plungers to conduct mode switching.

In the apparatus in which mode switching is conducted by an electrical operation, a relatively smooth switching operation is attainable if a motor is used as a power driving source. However, such construction does not realize compactness. On the other hand, if a plunger mechanism is used as the power drive source, a compact device results, however, mechanical impact may be generated in each switching operation. Both constructions provide a merit on one hand, and a defect on the other.

Manual operation is widely available for changing the modes of a tape recorder. If mode switching operation is carried out by a plunger driving operation, the linear movement of the plunger must be converted into a rotational movement, and the rotational movement must be performed at a predetermined period.

In most tape recorders, various mode changing operations are manually performed by making use of the linear movement of an operation rod or a rotational movement thereof. In order to automatically perform such a mode switching operation, it is necessary to provide a driving source adapted to independently drive an operation system for the respective modes.

SUMMARY OF THE INVENTION

It is, therefore, an object of the present invention to provide an operation apparatus having a plunger mechanism as a driving source to provide a compact construction, yet eliminating problems due to impact during actuation of the plunger. This object will be attained by disposing the plunger devices along a direction perpendicular to the shifting direction of the operation rods of the tape recorder, so that the operation system is not degraded by the mechanical impact of the plunger.

Another object of the invention is to provide a device capable of performing an electrically actuated mode switching operation. To attain this object, according to the invention, plungers are independently provided for the mode switching operations, and upon the retracting movement of the plunger, the power from a motor is transmitted to the switching operation system to thus perform the predetermined operation.

Another object of the invention is to provide a mode switching apparatus wherein an operation force is stably transmitted to the operation rods during a mode switching operation, such force transmission to the operation rod being interrupted during a non-switching operation. To attain this object, according to this invention, a drive gear is normally rotated when a main switch is turned on. Each of several clutch gears having a partially non toothed portion is provided engageable with said drive gear with respect to each of the modes. The clutch gear is normally urged in one direction, and against this force is locked, the locking state of the clutch gear is being released by the rotation of a locking arm upon the energization of a plunger, so that the clutch gear is brought into meshing engagement with said drive gear.

A further object of this invention to provide a plunger device for a mode switching operation which provides a compact construction at a low price. To attain this object, according to the present invention, the plunger is provided with a plunger rod retractable upon current flowing to a solenoid coil, in other words, upon energization of the coil. A spring reception flange made of plastic material is provided at an end of the plunger rod, a restoration spring is provided over the plunger rod. One end of the spring urges the spring reception flange so that the plunger rod moves outwardly upon deenergization of the solenoid coil. With this structure, plunger assembly work is easily carried out. Therefore, even in the case of a small plunger device, easy assembly results.

DETAILED DESCRIPTION OF THE EMBODIMENTS

Figure 1:
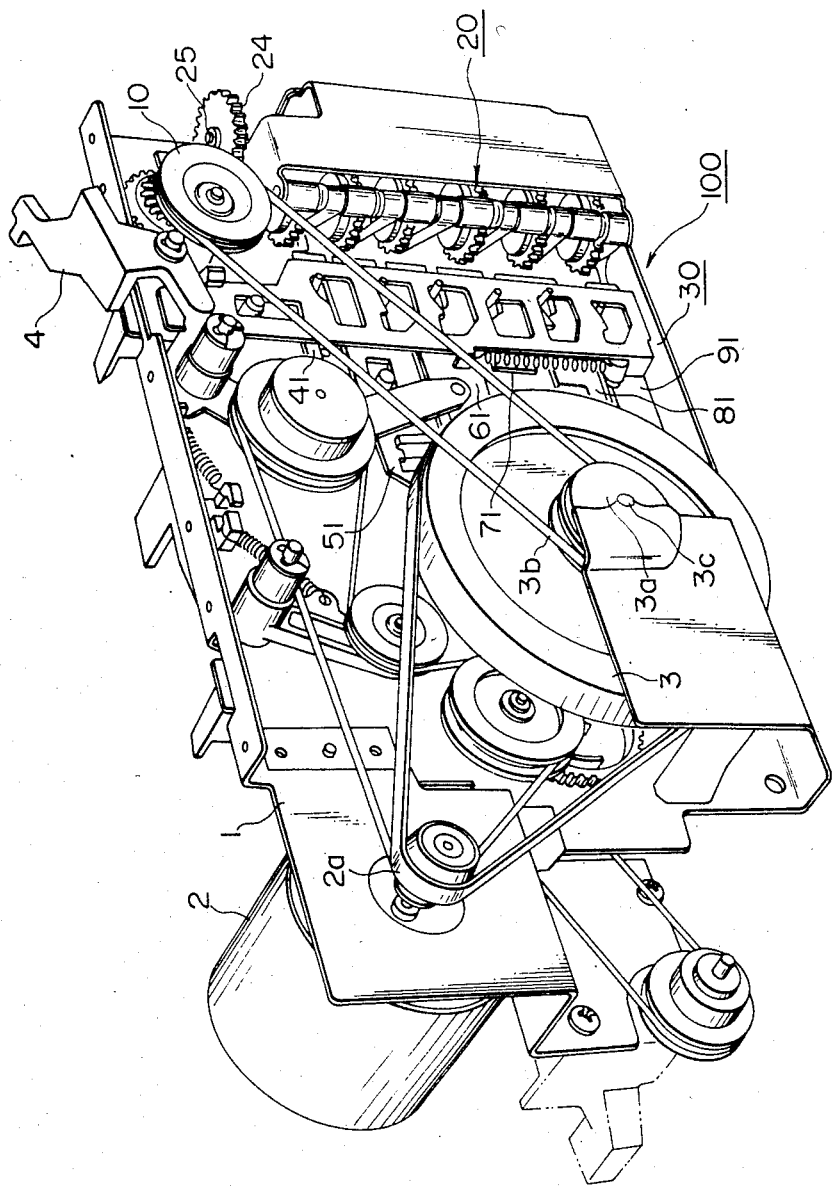
FIG. 1 is a perspective view showing the overall recorder including the apparatus of the present invention.

This invention will now be described with reference to accompanying drawings. FIG. 1 is a perspective view showing the internal mechanism of a tape recorder according to the invention. A motor 2 is mounted on a chassis 1, and an output of the motor 2 is transmitted to a flywheel 3 through a power transmission belt 2a. A capstan is driven by the rotation of the flywheel 3. A pulley 3a is mounted on the flywheel 3 and a belt 3b is mounted between the pulley 3a and an input pulley 10 of a switching operation apparatus 100. Upon rotation of the input pulley 10, the switching operation apparatus 100 is actuated when required.

Figure 2:
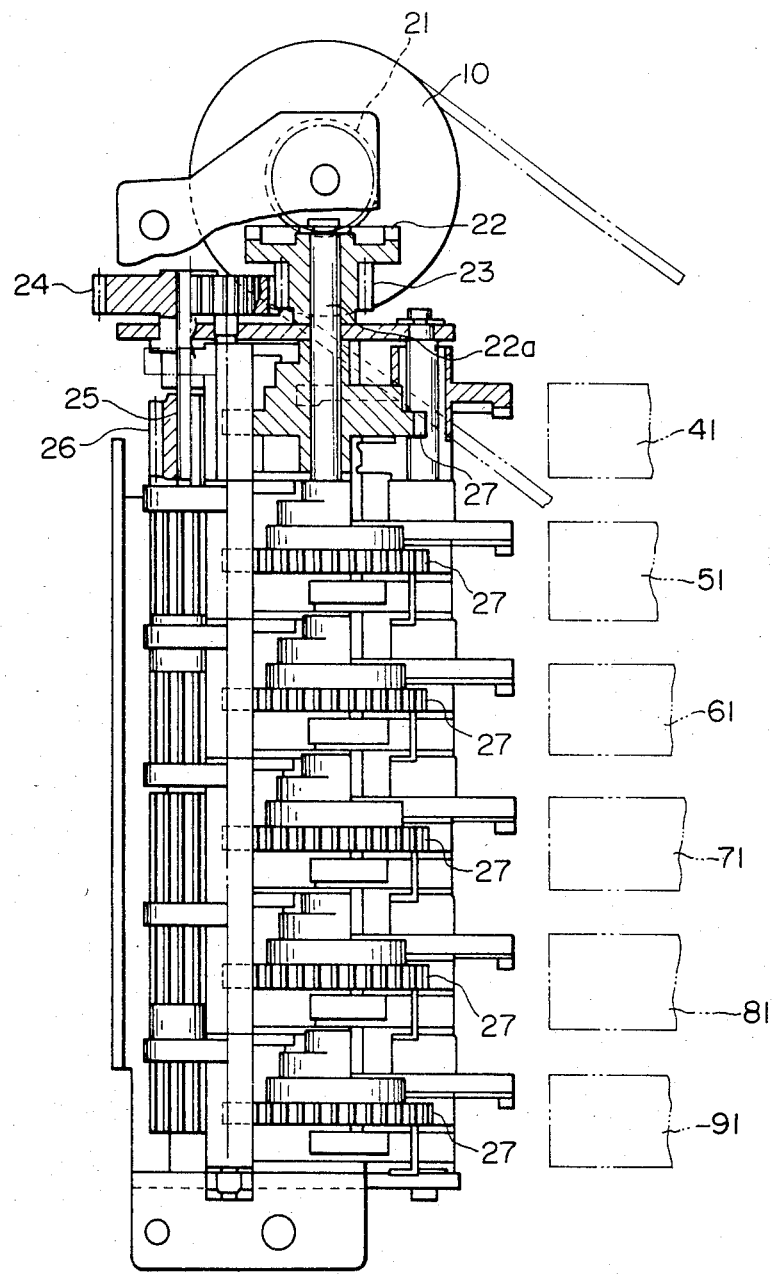
FIG. 2 is a side view, partially in cross section, showing a portion of a mode switching operation apparatus.
Figure 3:
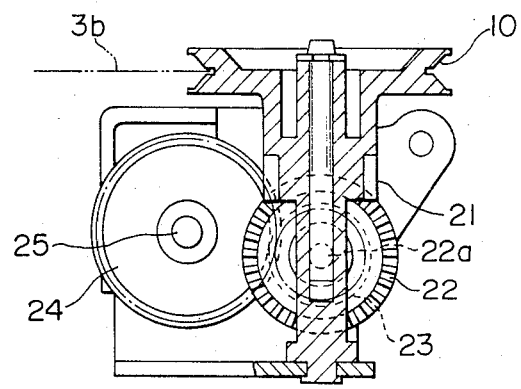
FIG. 3 is a plan view at a cross sectional part of FIG. 2.

The switching operation apparatus 100 includes a switch drive mechanism 20 and a holding mechanism 30. As shown in FIGS. 2 and 3, in the switch drive mechanism 20, a pinion 21 provided at a boss portion of the input pulley 10 is engaged with a crown gear 22. At a boss portion of the crown gear 22, a pinion 23 is provided which is in meshing engagement with a spur gear 24. At a boss portion of the spur gear 24, an elongated shaft 25 is fitted, and a drive gear 26 is arranged along the shaft 25. A central axis 22a of the crown gear 22 extends parallel to the axial direction of the drive gear 26, and clutch gears 27 are independently mounted on the central shaft 22a in multi-stage fashion for the respective modes.

Figure 4:
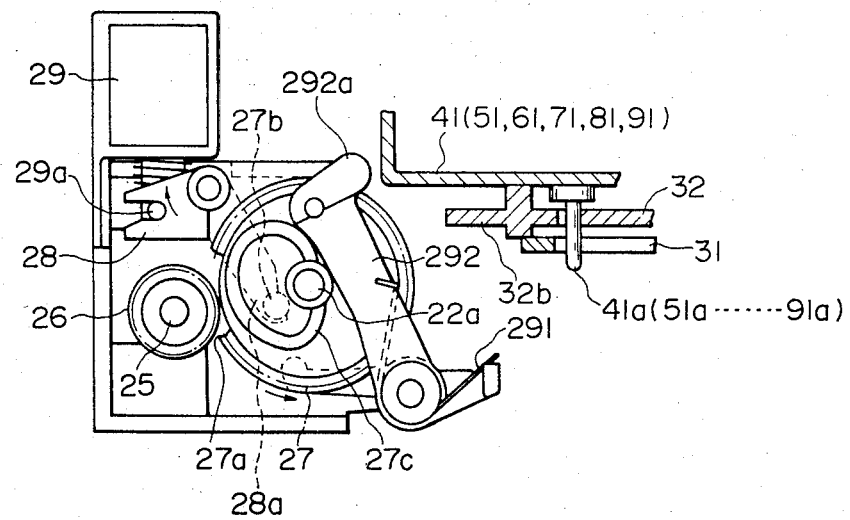
FIG. 4 is a horizontal cross sectional view showing the same portion.

As shown in FIG. 4, a portion of the clutch gear 27 lacks gear teeth to provide a tooth lacking portion 27a. The clutch gear 27 is engageable with the drive gear 26 except for when opposite the tooth lacking portion 27a. A locking pin 27b is protruded from the lower surface of the clutch gear 27. The locking pin 27b is brought into locking engagement with a locking end 28a of a locking arm 28 pivotally supported on the chassis 1, to thus restrict the rotation of the clutch gear 27. The locking arm 28 has its other end engageable with a locking pin 29a provided at the rod of a plunger 29 arranged for every mode. Upon actuation of the plunger, the locking arm 28 is rotated in the clockwise direction in the drawing, to thereby disengage the locking end 28a of the locking arm from the locking pin 27b of the clutch gear, to enable rotation thereof.

A cam 27c is mounted on an upper surface of the respective clutch gears 27, and the cams 27c are rotated integrally with the clutch gears. At a surface of the cam 27c, an operation arm 292 is disposed which is urged toward the cam surface by the biasing force of a torsion spring 291. This arrangement is the same for each respective mode. The operation arm 292 is provided pivotably on the chassis 1, and has a tip end provided with a abutting portion 292a. The abutting portion 292a selectively urges one of the mode operation rods, which are arranged for every mode, such as the mode operation rod 41 for the stop operation, the stop mode operation rod 51 for fast forward, the rod 61 for rewind, the rod 71 for pause, the rod 81 for playback and the mode operation rod 91 for recording.

Figure 5:
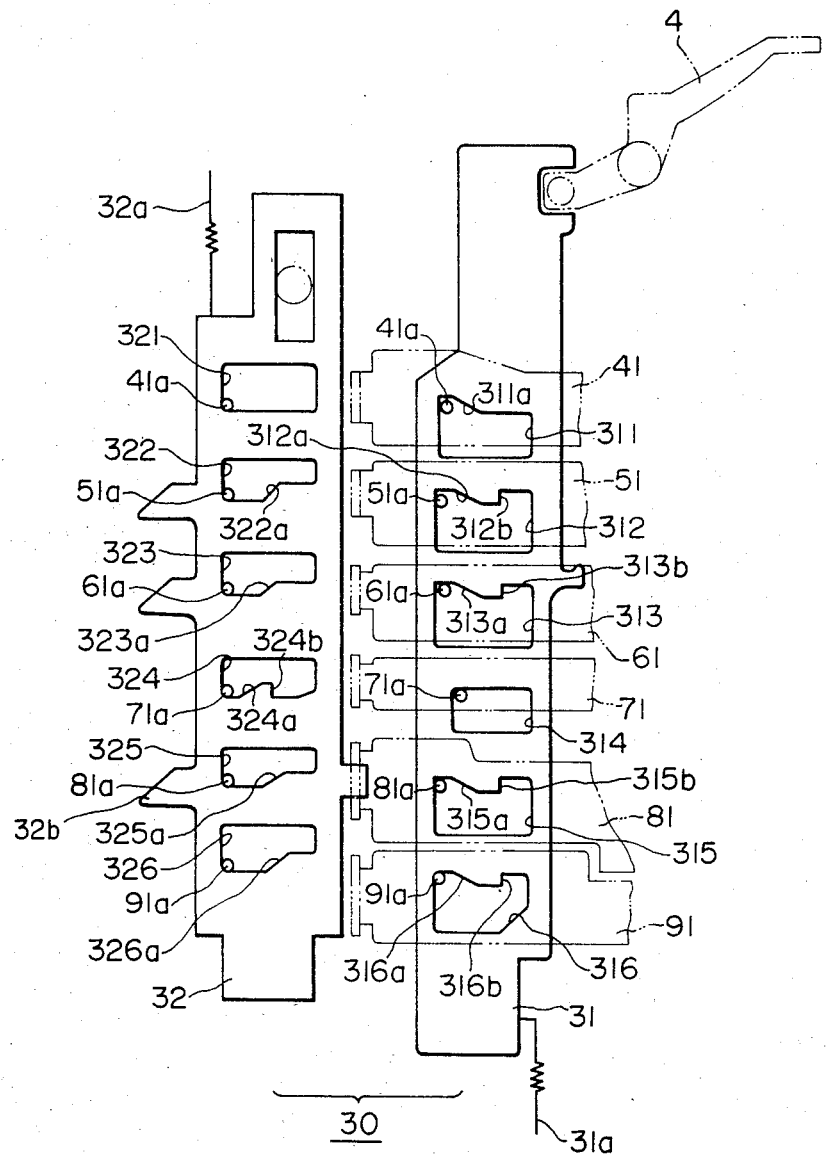
FIG. 5 is a side exploded illustration of the device for holding and releasing of each of the mode operations.

The mode operation rods 41, 51, 61, 71, 81 and 91 are provided in parallel and extend horizontally from a top horizontal plane to a bottom plane in the above mentioned order 41 and 91. At a longitudinal center portion of the mode operation rod, the holding mechanism 30 is provided. As shown in FIG. 5, the holding mechanism 30 includes a thin elongated locking plate 31 and a locking slider 32 each bridging the mode operation rods 41, 51, 61, 71, 81, and 91. The locking plate 31 and the slider 32 are vertically movably supported perpendicular to the moving direction of the mode operation rods, and are superimposedly disposed on the mode operation rods (FIG. 5 shows an exploded view). The locking plate 31 is slidable in a downward direction by a spring 31a, whereas the locking slider 32 is slidable in an upward direction by a spring 32a (the opposite of the locking plate 31). At the upper end of the locking plate 31, an ejecting lever 4 is provided so as to move the locking plate 31 upwardly against the biasing force of the spring 31a upon operation of the eject lever.

In the locking plate 31, window holes 311, 312, 313, 314, 315 and 316 are formed at positions confronting the respective mode operation rods 41, 51, 61, 71, 81 and 91. Similarly, in the locking guide 32, window holes 321, 322, 323, 324, 325 and 326 are formed at positions in alignment with the respective upper portions of the respective window holes formed in the locking plate 31. Therefore, partly aligned are the window holes 311 and 321; 312 and 322; 313 and 323; 314 and 324; 315 and 325; and 316 and 326. The operation rod 41 for the stop mode has a side surface provided integrally with a locking pin 41a which extends through the window holes 311 and 321. The mode operation rod 51 for the fast forward mode has a side surface integrally provided with a locking pin 51a which extends through the window holes 312 and 322. The mode operation rod 61 for rewinding has a side surface integrally provided with a locking pin 61a extending through the window holes 313 and 323. The rod 71 for the pause mode has an integral locking pin 71a extending through the window holes 214 and 324. Rod 81 for the playback operation has an integral locking pin 81a extending through the window holes 315 and 325, and the rod 91 for recording has a surface integrally provided with a locking pin 91a extending through the window holes 316 and 326.

With this structure, when each of the operation rods is operated, the integrally provided locking pins 41a, 51a, 61a, 71a, 81a and 91a move within the window holes of the locking plate 31 and the locking guide 32. Among these operation rods, the mode operation rods 51, 61, 81 and 91 for fast forward, rewind, playback and record are held by the locking plate 31 by means of the respective locking pins. In the window hole 312 corresponding to the mode operation rod 51 for fast forward, since the locking plate 31 is urged downwardly by the biasing force of the spring, the window 312 has a cam projection 312a and an interlocking portion 312b at an upper edge thereof, so that upon operation of the mode operation rod 51, the locking pin 51a is guided into the window 312 simultaneously urging the locking plate 31 upwardly by the contact with the cam projection 312a, and is engaged with the interlocking portion 312b, to thus maintain the operative condition. Similarly, each of the windows 313, 315, and 316 corresponding to the opeation rods for the rewind, playback and record modes is provided with cam projections 313a, 315a, 316a and interlocking portions 313b, 315b and 316b.

Concerning the window hole 311 corresponding to the operation rod 41 for the stop mode, the abovementioned locking engagement between the locking pins and the interlocking portions for the respective mode operation rods can be released by urging the locking plate 31 upwardly. For this release operation, in the window hole 311, only a cam projection 311a is provided at an upper edge thereof. By the operation of the stop mode operation rod 41, the cam projection 311a and the locking pin 41a urges the locking plate 31 upwardly. This operation is the same as that of the eject lever 4 connected to the upper portion of the locking plate 31. Therefore, the respective locking of the mode operation rods can also be released by the operation of the eject lever 4.

Further, the mode operation rod 71 for the pause mode is independently operated before or after the operation of the abovementioned mode operation rods, so the operation of holding or releasing the mode operation rod 71 for the pause mode is carried out using the locking slider 32 rather than the locking plate side 31. That is, the window hole 324 of the locking slider 32 corresponding to the pause mode operation rod 71, has a cam projection 324a and an interlocking portion 324b formed at the lower edge thereof. In order to release the interlocking engagement of the pause mode, a tapered projection 81b is formed on the main body of the locking slider 32. Upon operation of a selected operation arm 292, the locking slider 32 is urged downwardly by means of the tapered projection 81b, so that the locking engagement of the locking pin 71a and the interlocking portion 324b is released.

With the structure thus organized, when the plunger for the playback mode is energized to urge the pin 29a inwardly, the locking arm 28 is rotated to disengage the locking pin 27b of the clutch gear 27, so that the clutch gear 27 is brought into meshing engagement with the drive gear 26. Therefore, cam 27c is rotated together with the rotation of the clutch gear to urge the operation arm 292. As a result, the playback mode operation rod 81 is operably moved. In response to the movement of the rod 81, the locking pin 81a provided integrally with the operation rod 81 is moved, so that the pin 81a is brought into locking engagement with the interlocking portion 315b of the window hole 315, to thus maintain the operation rod 81 in the operating position.

Then, for releasing the playback mode, the stop mode is operated in the same manner as above to move the mode operation rod 41, by which the locking plate 31 is urged upwardly by means of the locking pin 41a and the cam projection 311a formed in the window hole 311 of the locking plate 31. As a result, the locking pin 81a of the playback mode operation rod 81 is disengaged from the interlocking portion 315b, to thus release the holding of the playback mode.

In this case, instead of operating the stop mode, the locking plate 31 can be urged upwardly to release the playback mode by means of the eject lever 4.

Figure 6:
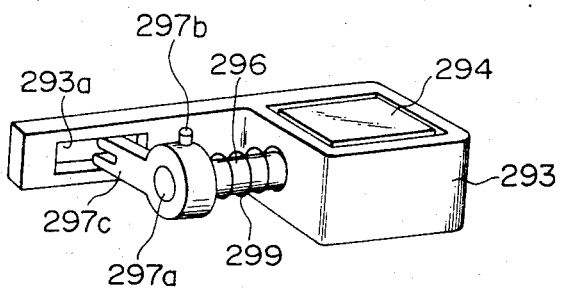
FIG. 6 is a perspective view showing a plunger device according to this invention.
Figure 7:
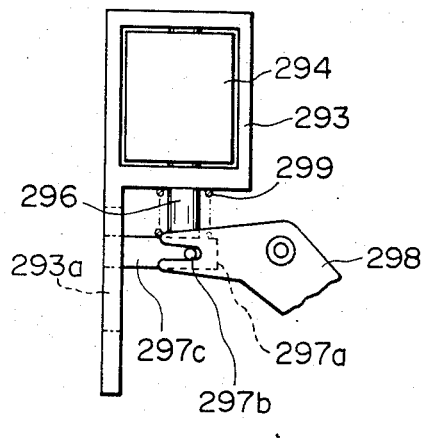
FIG. 7 is a plan view of the plunger device according to the invention.
Figure 8:
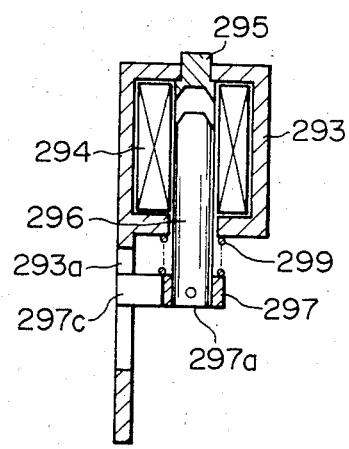
FIG. 8 is a transverse cross sectional view showing the plunger device of the invention.

Next, a plunger assembly will be described with reference to FIGS. 6 to 8. In the drawings, reference numeral 293 designates a frame constituting a plunger device. In an interior space of the frame 293, a solenoid coil 294 is provided. At an axial center of the solenoid coil 294 is provided a plunger receiver 295.

In the plunger receiver 295, a plunger rod 296 is fitted and is adapted to perform linear movement in a predetermined stroke along the axial direction thereof. The plunger rod has an end protruding from an end face of the frame 293. At the tip end of the plunger rod, a spring reception flange 297 is fitted. The flange 297 is formed with a shaft hole 297a at its center, and a tip end of a plunger rod 296 is tightly fitted within the shaft hole. A spring reception flange 297 is formed of plastic material, and a pin 297b protrudes from the peripheral surface of the flange. The pin 297b is adapted to fit within one end of the arm 298 which converts linear movement into rotational movement. Further, a guide pin 297c protrudes from one side of the periphery of the spring reception flange 297. The guide pin 297c performs reciprocating guiding movement and is fitted in a guide 293a of the frame 293.

The spring reception flange 297 is urged by a compression spring 299 provided over the plunger rod 296. The compression spring 299 has its other end in abutment with an end face of the frame 293, so that the plunger rod 296 is normally urged toward its extended position.

The plunger device according to this invention, thus constructed, is provided simply by fitting the spring reception flange formed of plastic material, which is previously molded, without performing special machining or molding relative to the plunger rod.

As is apparent from the foregoing description, according to the mode operation apparatus of the tape recorder of the present invention, the plungers are arranged along a direction perpendicular to the moving direction of the levers which operate the respective modes, so the impact of the plungers is not transmitted in the lever moving direction, to thus prevent misoperation. According to the mode switching apparatus of the invention, mode switching is performed by the energization of plungers provided independently relative to each mode, so that only a relatively light operation is required to supply electric current to the plunger. Further, since the plungers are independently provided for each mode, a simple controlling circuit results, and no timing control is required. Particularly, if one of the plungers is out of order, the corresponding mode is not operable. However, the entire mechanism is not damaged by the operation of another mode due to misoperation.

In view of the foregoing, according to the mode switching apparatus of the present invention, the clutch gear having non-toothed portion is engageable with the drive gear normally rotated during the operating state, and in the case of a mode switching operation, the clutch gear is brought into meshing engagement with the drive gear, upon energization of the plunger, to rotate the operation arm by means of the cam provided on the clutch gear. As a result, each of the mode operation rods is selectively urged to perform mode selection. The rotational driving force of the drive gear can perform the mode switching operation with small force. That is, the non-operating locked state of the clutch gear can be released by the actuation of the plunger, and upon release, the clutch gear is brought into engagement with the drive gear by a bias on the clutch gear or other suitable means, to thereby perform a mode switching operation. The locked state of the clutch gear can be released with a small force.

In the plunger device of the present invention, the plunger rod is retracted by the electric current supply to a solenoid coil. At a tip end of the plunger rod, a spring reception flange formed of resilient plastic material is fitted, so that it is unnecessary to conduct special machining of the plunger rod itself, and easy assembly results. Further, in case of the employment of a compact plunger device, easy assembling work can be carried out even with the employment of a plunger rod having a small diameter. Furthermore, it is possible to conduct disassembly, and locking due to magnetization is avoidable.

What is claimed is:

1. A mode switching apparatus for a tape recorder of the type operable in a plurality of modes, comprising; a plurality of plungers for initiating mode switching operations, a plurality of mode operation rods, one being provided for each of the modes, for effecting a mode switching operation, a locking arm provided for each said plunger and rotatable through an angle upon linear movement of said plunger; clutch gears being provided for each plunger and normally locked by said locking arms, rotatably mounted operation arms located adjacent each said clutch gear, cam means mounted on each said clutch gear for rotating said operation arms, said mode operation rods being respectively urged in an operational direction by said operation arms; a drive gear for driving said clutch gears, said clutch gears having non-toothed portions providing a non-engaging state with said drive gear and being locked by said locking arms.

2. A mode operating apparatus for a tape recorder of the type capable of operation in a plurality of selectable modes, comprising; a motor, a drive gear driven by said motor and arranged proximate a plurality operation rods, one operation rod being provided for each of said modes; transfer gears selectively engagable with said drive gear and being provided for each of said operation rods; means for selectively engaging said drive gear with a selected transfer gear, comprising arm means provided for rotationally locking each said gear; and a plurality of plungers for respectively driving each said arm means to unlock the associated transfer gear to permit the associated transfer gear to be engaged with and rotated by said drive gear; said operation rods being independently operated in response to the rotation of a respective associated transfer gear.

3. An apparatus as claimed in claim 2, further including cam and follower means between said transfer gear and a respective mode operating rod.

4. An apparatus as claimed in claim 3, further including means for biasing a rod of said plunger, means engaging said plunger and said arm and means for guiding said plunger rod.

5. An apparatus as claimed in claim 4, said means engaging said plunger and said arm comprising resilient flange means including a pin and a guide portion, said flange being fitted over an end of said plunger rod.

6. An apparatus as claimed in claim 3, said cam and follower means comprising a cam formed on said transfer gear, a follower arm biased toward said cam and including an engagement end, said engagement end being contacted with one of said mode operation rods to effect linear movement thereof upon actuation of said follower arm.

7. An apparatus as claimed in claim 2, said transfer gear being driven by said drive gear, said transfer gear including a non-toothed portion confronting said drive gear when said arm engages said gear.

8. An apparatus as claimed in claim 2, including means biasing said transfer gear against said arms whereby said transfer gear rotates when released by said arm.

9. An apparatus as claimed in claim 8, said biasing means comprising spring means urging said follower into contact with said cam.

* * * * *